Figures 1, 2:
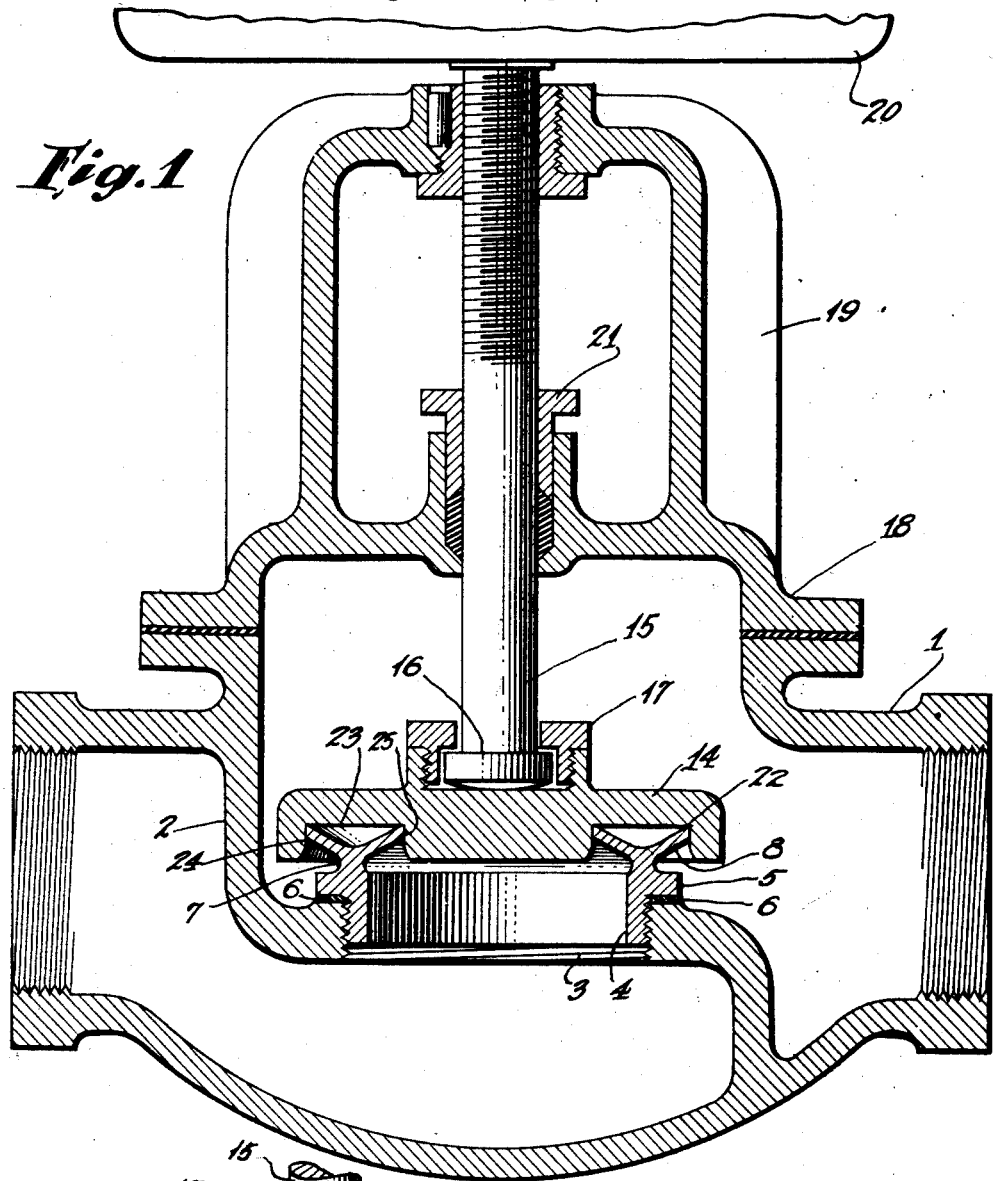

Jan. 15, 1929.

W. G. WILSON

VALVE

Original Filed April 24, 1926

1,699,217

INVENTOR.
Wylie G. Wilson
BY James L. Stewart
ATTORNEYS.

Patented Jan. 15, 1929.

1,699,217

UNITED STATES PATENT OFFICE.

WYLIE G. WILSON, OF JERSEY CITY, NEW JERSEY.

VALVE.

Application filed April 24, 1926, Serial No. 104,445. Renewed June 20, 1928.

This invention is a valve adapted for general application.

In the valve art, it is of fundamental importance that the seal effected by the valve be a tight seal and that the valve be capable of functioning a great number of times without becoming leaky, i. e., it should be repetitive in character, while retaining its capacity to produce a tight seal.

In valve construction, the seal is effected by two cooperable sealing elements, one of which is generally fixed and the other movable. The former may be termed, for the purposes of the invention, the seat, and the latter, the sealing member.

Pursuant to the practices of the prior art, valve seals have been formed by bringing a rigid sealing member into engagement with a rigid seat, or by forming one of these elements of material which is permanently deformed or distorted in producing the seal, or by interposing a gasket, composed of permanently deformable material, intermediate the sealing member and its seat. In the first instance, difficulties are encountered in accomplishing a tight seal because of irregularities in the two surfaces incident to their construction, to wear, to the presence of foreign matter between them, or to other causes. In the second and third instances, the deformable bodies very soon become so permanently distorted, as a result of wear, physical deterioration or other cause, that they can no longer produce a tight seal. In all such prior art structures, frequent inspection and repairs, at very considerable annoyance and expense, are necessary in order to maintain tight valves.

With these considerations in mind, the primary object of the present invention is to provide a valve capable of effecting a tight seal throughout long periods of repetitive use and under operating conditions, whereunder the valves of the prior art become ineffective after a relatively short period.

Another object of the invention is to so constitute the sealing elements and so operate them, that they may be constructed economically and without that refined workmanship which is usually incident to the grinding of valves and valve seats so that they will cooperate perfectly. The present structures are such that, even though in their primary manufacture they may not be axially coincident with relation to each other or of truly complementary shape, yet in the operation of the valve, they will adjust themselves to such irregularities and compensate for the same by reason of the material from which they are manufactured and the particular form employed in this connection.

Generally speaking, the valve of this invention embodies a sealing element, which preferably, though not necessarily, constitutes the valve seat. This sealing element is of annular form and of substantially V-shaped cross section. That is to say, it embodies two coaxial hollow frusto conical sections, the outer periphery of one of which is integral with the inner periphery of the other, so that the element may be described as of composite hollow frusto conical form.

By a "hollow frusto conical section," I mean a frusto conical section which is hollowed out to provide a frusto conical shell.

I have discovered that a sealing element of this form will function with remarkable efficiency in the formation of a tight repetitive seal, when constituted from materials which, for the purpose of this invention, are termed "obdurate materials." By this term is meant materials which are bendable, but not easily bent, compressible, but not easily compressed, elastic, but not easily deformed. As examples of obdurate material, I may mention, without excluding others, iron, steel, hard alloys (such as bronze), glass, ceramic materials, hard rubber and wood. These materials are in pronounced contradistinction to those, which may be termed "non-obdurate," such as leather, asbestos, soft rubber, soft metals, etc.

The obdurate materials, when employed pursuant to this invention, are operated within their elastic limit, by which I mean that, when embodied in the form of a sealing element and placed under stresses which tend to deform said element, incident to producing a seal, the element shall retain a positive tendency to resume its original form when the stresses are relieved.

I have further discovered that if a sealing element of unbroken composite hollow frusto conical section is placed under axial compression, which tends to flatten it, the outer periphery of said composite section will expand cross axially and its inner periphery will cross axially contract to bring either or both of said peripheries into engagement with suitable cooperating sealing elements for the purpose of producing a tight seal.

"Unbroken", as used above, may be defined as peripherally continuous; i. e., not slotted or formed into fingers.

By "axial compression", I mean pressure exerted upon the sealing element in a direction coaxial with or parallel to its axis, whereby its altitude is diminished and its peripheral diameter increased.

Attention is particularly directed to the fact that the stressing of the obdurate sealing element must be within the elastic limit thereof; otherwise said element would not tend to resume (i. e., tend to spring back to) its normal unsealing form. Only an element in the sense of this invention composed of obdurate material and embodying a substantially frusto conical configuration will thus properly function.

The term "elastic limit" as employed in the specification and claims of this application is so employed to designate that quality or characteristic of the conical forms of obdurate material employed which, when compressed within predetermined limit and then relieved of such compression, will cause said conical form to tend to return to approximately its original form and size. It is intended that such compression shall be within and not beyond the tendency of said conical section to return to its original form and size. That is to say, it is intended that the degree of axial pressure employed shall not be sufficient to break down and destroy the resilient or reactive quality of the conical form herein described. On the contrary, it is the purpose in practicing this invention that the degree of compression employed shall be limited to a degree where such reactive characteristic of said conical form will not be seriously affected.

For a better understanding of the operation of the V shaped sealing element of this invention, it is suggested that each of the hollow cones which enter into its construction function like a toggle. This analogy is, of course, not absolute, but when considered in that light, it may be helpful to a clearer conception of the operation of the invention. When force is applied to the elbow of a toggle, a greater force is exerted at the ends of the toggle links, and this force increases in proportion as the axial dimension of the toggle, relative to the distance between the ends of the links, become less and less.

The sealing element of the present invention may be considered as functioning like a multiplicity of toggles; that is to say, there is a double toggle-like action in each diametric plane, and, obviously, there is an infinite number of toggles. When the sealing element is compressed axially, the dimensions of such element and the proportioning of the obdurate material of which it is composed, bring about, within the element, the steadily increasing functional characteristics incidental to toggle action. This action results in a cross axial or radial movement of the sealing element until its peripheries are forced into tight sealing engagement with cooperating seats. The obdurate element, in either case, is so dimensioned and proportioned that the seal is effected, in the manner described, before the elastic limit of the element is reached. Accordingly, upon release of the stresses incident to producing the seal, the element tends to autogenously, i. e., automatically, break the seal.

In practically carrying out the invention, I preferably utilize the obdurate sealing element as a valve seat and mount the seat in normally stationary relation within the valve casing with the hollow composite frusto conical element attached to or integral with a suitable valve seat ring which is preferably removably secured coaxially of the port which it is desired to seal or unseal. The sealing element is secured to a seat ring preferably by integrally forming the ring and element with the parts united at the apex of the V shaped section of the element so that both the inner and outer peripheries of said element are left free for conjoint cooperation with the sealing member. The sealing member of the valve is preferably of rigid construction and is mounted on a suitable valve stem to be moved axially of the obdurate valve seat into and out of engagement with the latter.

The sealing member is preferably formed with an abutment adapted when engaged with the obdurate seat member to preclude further independent movement of the sealing member in a sealing direction, so that pressure thereafter applied to force the sealing member in the direction of the seat will place the hollow frusto conical seat member under axial compression for the purpose of peripherally contracting its inner periphery and expanding its outer periphrey into sealing relation with suitable supplemental seats formed on the sealing member and coaxial with the peripheries of the seat member.

The parts are so proportioned that the sealing member may be readily moved into and out of cooperative relation with the seat member without binding, but the fit between the parts is sufficiently close so that when the seat member is axially compressed, a relatively small amount of cross axial expansion and contraction are required to effect the double sealing relation between the parts as specified.

It will thus be apparent that the present invention solves many problems which have long been recognized. It provides for a perfect seal by the application of a minimum of force and this seal may be made and broken a great number of times without excessive wear on the elements of the valve. Moreover, it is characteristic of the invention that when the sealing stresses are relieved, the obdurate sealing element will automatically, i. e., autogeneously, tend to return to its original form; that is to say, for all practical purposes, it will return to its unstressed form, though not necessarily to absolutely the same form as it was prior to compression, for it may change slightly under compression.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a cross section of a valve embodying the present invention. In this view, the parts are shown in normal sealing relation; and, Figure 2 is a fragmental view of the sealing elements of the valve of Figure 1 showing the sealing member slightly unseated from its seat.

Referring to the drawings, 1 designates a valve casing having a partition or diaphragm 2 in which is formed a port opening 3. The port opening 3 is threaded to receive the complementarily threaded seat ring 4 through which there is an axial passage. The seat ring is provided with a flange 5 adapted to seat upon the diaphragm adjacent the port opening 3 and a gasket 6 is interposed between the parts to preclude leakage.

Formed integrally with the seat ring and extending upwardly from the top thereof is a web 7 to which is integrally united the obdurate seat member of this invention. As shown in the drawings, this seat member is designated broadly by the reference character 8 and is composed of two hollow frusto conical sections 9 and 10 positioned with the inner periphery of the former integral with the outer periphery of the latter, and both integral with the web 7, so that said seat member is, in effect, V shaped in cross section. The outer periphery of the seat member 8 is designated 11 and the inner periphery thereof is designated 12. Both of these peripheries are free and unobstructed.

The sealing member, which is designated 14, is carried by the valve stem 15 which is provided at its lower end with an enlargement 16. This enlargement seats in a pocket formed in a boss coaxial of the sealing member and a retaining nut 17 threads into the pocket for the purpose of securing the sealing element against inadvertent release from the valve stem.

The valve casing 1 is provided with a suitable bonnet 18 having thereon a yoke 19 through which the valve stem threads. The stem is provided beyond the yoke, with a hand wheel 20, whereby it may be operated and a packing gland 21 cooperates with the stem to preclude leakage at the point where the stem passes through the casing.

As shown in the drawings, the sealing member 14 is provided on its under side with an annular channel 22, the surface 23 of which constitutes an abutment and the coaxial annular faces 24 and 25 of which constitute supplemental seats and are uniformly spaced apart. Both of these supplemental seats are preferably substantially cylindrical, the diameter of the seat 24 being slightly greater than the outer diameter of the seat member 8 and the diameter of the surface 25 being slightly less than the inner diameter of said seat member. The surface 23 is preferably substantially flat.

When it is desired to permit the flow of fluid through the valve, the hand wheel is operated to lift the sealing member 14 free from the seat member 8, so that the sealing member will be removed as far as possible from the path of the fluid. When the parts are in this unsealing condition, the seat member will be unstressed and will be, in effect, in neutral condition.

When it is desired to seal the valve to stop the flow of fluid therethrough, the hand wheel is operated to axially move the valve stem in a direction to lower the sealing element 14 into engagement with the seat member 8. This operation continues until the surface of abutment 23 of the sealing member engages with the upper edge of the obdurate seat member 8 and a further relative movement between the sealing member and the seat member in a sealing direction is precluded. When thus positioned, the seat member will loosely occupy the channel of the sealing member as shown in Figure 2. If, however, rotation of the hand wheel is continued and pressure applied to the sealing member, this pressure will be imparted to the valve seat member 8 for the purpose of axially compressing said seat and decreasing its altitude. This decrease in altitude will be accompanied by a simultaneous cross axial expansion of its outer periphery 11 into engagement with the supplemental seat 24, and there will simultaneously result a cross axial contraction of the inner periphery 12 of the valve seat member into engagement with the supplemental seat 25. Thus, through stressing of the obdurate composite frusto conical seat member, its free edges or peripheries will be expanded and contracted into tight sealing relation with the supplemental seats 24 and 25 of the sealing member.

Slight irregularities in said supplemental seats or the peripheral edges of the seat member will not interfere with the production of a tight impervious seal and even though the cooperating parts may be slightly out of round or out of exact coaxial relation, the seal will nevertheless result as the obdurate seat will compensate for such irregularities. The relatively loose mounting of the sealing member on the valve stem further serves to permit proper cooperation of the parts in the formation of the tight seal desired.

It will be noted that when the sealing member is moved into engagement with the seat member at the commencement of the sealing operation, the seat member 8 will enter into the channel of the sealing member and effect a primary closure prior to the actual stressing of the seat. As this operation is rapidly accomplished, the flow of fluid through the seat passage is quickly shut off and wire drawing effects are minimized.

I have found as a result of exhaustive experimentation that by the employment of a hollow composite frusto conical seat member of obdurate material a repetitive seal is produced without requiring the usual grinding operations heretofore considered essential in the making of valves and valve seats. Thoroughly satisfactory results can be obtained in the construction described by machining the sealing member and the seat as is usual in the art without the grinding heretofore deemed essential.

So long as the valve is in sealing condition, the obdurate seat member 8 will remain in stressed condition. However, if the valve stem is unscrewed and the axial pressure on said member relieved, the stresses to which I have referred will automatically, i. e., autogenously, result in the shifting of said member into unstressed condition and will bring about within the member a return, at least in degree, towards its previous unstressed condition. As a result of this operation, the seal will be automatically broken and the sealing member 9 may be readily returned, without binding, into unsealing position to permit the flow of fluid through the valve.

Experience has shown that when a valve is constructed in the manner described, a thoroughly efficient seal is produced. This seal is truly repetitive in that the parts may be operated a great number of times without developing leaky conditions.

In the preferred manner of carrying out the invention, the seat member is preferably of V-shaped cross section. That is to say, it embodies the combination of two frusto conical sections having walls which are substantially straight. I have found that the best results are obtained when straight sided forms are employed. I am aware, however, that some of the advantages of the invention may be obtained through the employment of a sealing element of obdurate material embodying other than straight sided forms, such for example as might result from the employment of truncated, hollow, spherical or elliptical sections, but, in practice, they are not so desirable as the straight sided forms to which I have referred.

The tendency of the composite frusto conical seat member of obdurate material to autogenously return, or tend to return, to its original form after compression is relieved, is of primary importance. As previously stated, such a retraction does not necessarily involve a return of the element to exactly the same form as prior to compression, but to approximately that same form when considered from a practical standpoint. Such a tendency to return or spring back satisfies the practical requirements of the present invention. The resilient quality of the obdurate material from which the composite hollow, frusto conical element is made lends itself to repeated action and reaction through an extended period of operation and imparts to the valve the repetitive characteristics to which I have referred.

The foregoing detailed description sets forth the invention in its preferred, practical forms, but the invention is to be understood as fully commensurate with the appended claims.

The expression "conical section", as found in the appended claims, is to be given a sufficiently broad interpretation to include not only the straight sided frusto conical form illustrated in the drawings, but all of the other forms of the invention herein referred to.

For purposes of illustration, the space between the external and internal peripheries 11 and 12 of the conical element 8 and the supplemental seats 24 and 23 is shown enlarged. In practice this space is reduced to a minimum, a close sliding fit being preferable between said surfaces, so that when axial pressure is applied to the conical element a very slight pressure will cause said surfaces to positively engage. Under normal conditions a slight axial compression is sufficient to accomplish a satisfactory seal.

Having thus fully described the invention, what I claim as new and desire to secure by Letters Patent is:

1. In a valve, a valve seat formed of obdurate material, said seat being in the form of a hollow composite frusto conical section and having an integral supporting web extending therefrom intermediate its internal and external peripheries, said web being axially mounted with respect to the valve port, a sealing member axially mounted with respect to said seat, and means to operate the sealing member in the line of its axis, said sealing member being provided with supplemental seats adapted to cooperate with the inner and outer peripheries of the obdurate valve seat.

2. In a valve, a valve seat formed of obdurate material, said seat comprising inner and outer coaxial hollow frusto conical sections, with the inner edge of the outer section integral with the outer edge of the inner section, a supporting web integral with both sections and coaxial with the valve port, a sealing member axially mounted with respect to the valve seat, and means for operating the sealing member in the line of its axis, said sealing member being provided with supplemental seats cooperable with the free edges of the obdurate valve seat and formed within an annular aperture the base of which constitutes an abutment and which aperture is adapted to receive the valve seat and form a seal therewith.

3. In a valve, an annular valve seat of obdurate material and of V shaped cross section provided at its apex with an integral supporting web mounted in coaxial relation with the valve port, a sealing member axially mounted with respect to the valve seat and provided with an annular channel, the inner and outer cylindrical walls of which constitute supplemental seats cooperable with the free edges of the valve seat and the base of which channel constitutes an abutment adapted to bear upon the valve seat to place the latter under compression, and means to operate the sealing member in the line of its axis to move it into a position wherein the annular channel will house the free edges of the valve seat and the abutment of said channel will bear upon said seat to form a primary closure, and to thereafter axially compress the valve seat, within its elastic limit, to cross axially stress its peripheries into sealing engagement with the supplemental seats.

Signed by me at Jersey City, this 21st day of April, 1926.

WYLIE G. WILSON.